United States Patent Office 3,519,452
Patented July 7, 1970

3,519,452
SULFONATED CARBON BLACK PIGMENTED COMPOSITIONS
Donald Rivin, Framingham, Mass., Jerome Aron, Providence, R.I., and Haig C. Donoian, Chelmsford, Mass., assignors to Cabot Corporation, Boston, Mass., a corporation of Delaware
No Drawing. Filed Mar. 9, 1967, Ser. No. 621,758
Int. Cl. C08h 9/00; C09d 11/06, 11/10
U.S. Cl. 106—261                                     9 Claims

ABSTRACT OF THE DISCLOSURE

Coating compositions based on organic vehicles such as lacquers and inks, which compositions contain sulfonated carbon blacks and manifest improved properties of masstone jetness, blueness and viscosity stability. For example, the jetness, blue tone, and viscosity stabiltiy properties of lacquers based on such synthetic resins as acrylic and alkyd melamine resins and the properties of inks based on substantially aliphatic drying oils media such as heat bodied linseed oil are found to be enhanced by the incorporation of sulfonated carbon black pigments.

BACKGROUND OF INVENTION

This invention relates to improved coating compositions such as paints, lacquers, inks and the like containing a particular carbon black pigment. More particularly this invention relates to such compositions comprising a sulfonated carbon black which have been, surprisingly, discovered to have superior color and viscosity stability properties.

It has long been an object of research on carbon black pigments to provide pigments which can contribute improved color properties to a variety of systems. The prime systems in which such carbon blacks are utilized include paints, inks and resin-based lacquers such as those used in the automotive industry. At present, various oxidizing treatments are used on carbon blacks to achieve improvements for specific systems. Heretofore, however, sulfonated groups on carbon blacks have neither been known nor expected to contribute any valuable tinting properties, or viscosity-stabilizing properties, thereto. It has now been discovered that not only can such properties be achieved, but that they can be achieved in a wide variety of novel systems.

SUMMARY OF THE INVENTION

The invention relates to compositions comprising a sulfonated carbon black pigment and an organic vehicle in which the pigment is dispersed. Among compositions which are most advantageously modified by incorporation of a sulfonated carbon-black pigment therein are alkyd-based systems such as alkyd-melamine lacquer systems, acrylic resin-based systems such as acrylic melamine lacquer systems, and inks based on substantially aliphatic drying oils such as linseed oil.

Sulfonated blacks for use in the instant invention should be low in ash and tar content. Consequently, it is most advantageous that the process disclosed in commonly-owned application Ser. No. 560,904 filed June 27, 1966 by Rivin, Aron and Richards and now U.S. Pat No. 3,442,-679 be utilized in preparing sulfonated blacks for use in the compositions of the instant invention. By this process the reaction of carbon black with a sulfur oxide gas is carried out in about 10 to 65% oleum. Thus commercially-available oleum such as that which contains from about 15 to about 65% sulfur trioxide is conveniently used. The reaction can be carried out in a liquid slurry or, often more preferably, by only wetting the surface of the carbon black with the spraying or dropwise addition of oleum thereon. If this latter method is used, the black should be well agitated during oleum addition.

The sulfonation reaction is best carried out within the range of 15° to 70° C. but preferred temperatures are those between about 15° to 40° C. Lower temperatures will retard the reaction rate as is known to those skilled in the art. Higher temperatures will accelerate the reaction rate, but it is pointed out that the reactants should not be allowed to exceed their decomposition temperatures.

Assuming a reaction temperature of about 30° C., when 65% oleum is used, it is usually convenient to allow the reaction between sulfur trioxide and carbon black to proceed for from about one hour to about two days depending upon the amount of sulfonation desired on the carbon black. Shorter reaction times are used if lesser quantities of sulfonic groups are desired on the black. Longer reaction times can be used but, after about 48 hours, surface oxidation (formation of quinone, phenol and carboxyl surface groups) is likely to become an increasing problem. However, if the reaction time is under 72 hours the sulfonated carbon black formed by the process of the invention is substantially free from tars and is also extraordinarily low in ash content.

For many purposes a reaction time of two hours at 30° C. is sufficient; the degree of sulfonation obtained in two hours is about 40% of that obtained with a reaction period of up to eight days. The reaction is preferably ended quickly. A convenient method for so ending the reaction is to quench it on ice water. However, often a more convenient method is to form a salt such as —$SO_3Na$ salt by quenching with a solution of a salt of a strong base and weak acid such as $Na_2CO_3$ or a salt of a weak base and weak acid such as $(NH_4)_2CO_3$. Only a small excess of the salt of a weak acid need be used. Preferred are salts such as the carbonates which decompose leaving no residual acid. Other salts such as those leaving residual acid or base can be used, but care must be taken to avoid using excessive quantities of such salts.

DESCRIPTION OF SOME PREFERRED EMBODIMENTS

Typical acrylic resin and alkyd resin lacquer formulations were selected for demonstrating the pigmentation properties of sulfonated carbon blacks. The "mill paste" formulation, as known to those skilled in the art, is that part of the formulation in which carbon black is pre-mixed with a resin in a ball mill before reduction in the remainder of the formulation. In the preparation of this mill paste, the black pigment and resin were milled in a 6-inch diameter, 1 quart capacity mill for a specified time, generally from 15 to 45 hours. In general, a ball mill with a total formulation charge of 492 grams was considered fully charged and was advantageously milled for a longer period while a smaller mill charge of closer to 250 grams required a shorter milling period. The ball mill was loaded with about 7.5 lbs. of ½-inch diameter steel balls and about 4½ lbs. of ¼-inch diameter steel balls. After an appropriate milling period, the mill paste was "let down,"

with agitation, into the "reduction" mix according to the following formulas:

MILL PASTE COMPOSITION

|  | Half-charge (grams) | Full-charge (grams) |
|---|---|---|
| Black pigment dry | 30 | 69 |
| Resimene 876 [1] | 216 | 432 |

COMPOSITION AFTER REDUCTION STEP

|  | Acrylic-based | Alkyd-based |
|---|---|---|
| Mill paste | 60.0 | 60.0 |
| Acryloid AT56 [2] | 173.0 |  |
| Resimene 876 [1] | 21.4 | 22.6 |
| Aroplaz, 2,580 x 60 [3] |  | 146.5 |
| Xylene | 7.0 |  |
| n-Butanol | 1.0 | 10.0 |
| Solvesso 150 |  | 15.0 |
| Ethyl acetate |  | 10.0 |
| Diethylamine |  | 0.05 |

[1] A tradename of Monsanto Company for 50% melamine resin (butylated melamine, formaldehyde) in an n-butanol-xylene (40%-10%).
[2] A tradename of Rohm and Hass, for a 50% solution of acrylic resin (hydroxyl-containing acrylic polymer) in n-butanol-xylene (5%-45%).
[3] A tradename of Archer-Daniels-Midland, for a 60% solution of alkyd resin (a non-drying short oil alkyd) in xylene.

For the development of best color properties, the sulfonated blacks are advantageously adjusted to have moisture contents between about 4 and about 25%. Most desirably, this moisture level is adjusted between 10 and 20%. The blacks used in Example II and III below were adjusted to about a 15% moisture level.

EXAMPLE I

Sulfonated blacks in lithographic inks

An oil furnace carbon black pigment having a pH of 8.6 and Nigrometer scale of 85.2 sold under the tradename Regal 330 by Cabot Corporation was sulfonated by slurrying 200 grams of black in 1.4 liters of 30% oleum for 24 hours at 30–35° C. The sulfonated black had an increase in sulfur content equivalent to 0.07 milliequivalents per gram of $SO_3H$ groups.

This sulfonated black was compared, in an ink medium, i.e. a heat bodied linseed oil known to the art as "litho No. 1," with a medium flow furnace black which is known to contribute superior performance characteristics to most printing inks and carbon paper inks. This black is sold under the trade designation Regal 400R by Cabot Corporation.

Comparison of properties on standard ink-evaluation tests:

|  | Regal 400R | Sulfonated Regal 330 |
|---|---|---|
| Wetting time | Somewhat slower | Somewhat faster. |
| Fineness of grind |  | No significant difference |
| Masstone color |  | No significant difference |
| Tinting strength |  | No significant difference |
| Blueness |  | No significant difference |
| Flow |  | No significant difference |

The untreated Regal 330 itself has poorer tinting properties than the sulfonated material and Regal 400R.

It is concluded therefore, that a sulfonated Regal 330, i.e. a sulfonated oil furnace black, is a highly desirable pigment for incorporation into ink formulations. This is particularly important in view of the fact that Regal 400R is an oxidized furnace black which must be prepared only from a carefully selected raw material having very rigidly controlled properties.

The color properties of the compositions described in Examples II and III to be set forth below were achieved by utilizing a tri-stimulus colormeter known as the "Color-Eye" described in detail in Instruction Manual No. 1000G for Model D "Color-Eye" published by Instrument Development Laboratories Inc. of Attleboro, Massachusetts, the manufacturer of the instrument. In general, the Color-Eye compares light reflectance of a sample to a standard at three wave lengths in the visible light spectrum. These wave lengths are designated X, Y, and Z and are substantially amber, green and blue wave lengths respectively.

The Color-Eye instrument can be utilized to present a number of other qualitative assessments of color value. In this application the jetness of a pigment, or, more accurately, the jetness which a pigment is able to contribute to a lacquer system is evaluated in terms of the "Y" value. The desirable blueness contributed by a pigment is measured in terms of a "Yellowness Factor" which is mathematically described as $$\frac{(X \text{ value} - Z \text{ value})}{Y \text{ value}} \times 100$$

Lower Yellowness factors are indicative of a desirably bluer tone imparted by a pigment.

In the Color-Eye work reported below, an ISAF black sold under the tradename Vulcan 6 was used as a reference having XYZ value of 100 and a "Yellowness Factor" of 0.

EXAMPLE II

Sulfonated blacks in acrylic-melamine baking enamel

A medium color channel black sold under the trade designation Black Pearls 71 by Cabot Corporation was sulfonated by adding dropwise 0.06 liters of 65% oleum to 120 grams of carbon black. The black was agitated vigorously during this addition which took place over four hours. After being washed in water until, the wash water showed a negative $SO_4$ test, the black was analyzed.

The sulfonated product comprised 0.610 milliequivalents per gram of sulfur and 0.610 milliequivalents per gram of $-SO_3H$ groups.

The sulfonated black was incorporated into the acrylic resin based formulation as has been set forth above and evaluated with respect to the color qualities imparted thereto and viscosity characteristics thereof. These characteristics are set forth in Table I below:

TABLE I

| Black utilized in acrylic melamine enamel | Enamel properties ||||||
|---|---|---|---|---|---|---|
|  | Color-eye data |||| Viscosity, cps. ||
|  | X | Y | Z | YF | Mill paste | Enamel |
| Black Pearls 71, sulfonated | 21.1 | 26.0 | 45.4 | −93.7 | 2,328 | 400 |
| Black Pearls 607 | 19.1 | 22.3 | 35.0 | −71.3 | 5,304 | 416 |

Black Pearls 607 was selected for comparison purposes because it is an extremely good black for incorporation into acrylic-melamine lacquers of the type being demonstrated and has gained wide commercial acceptance. The sulfonated black is seen to have a jetness almost equal to the Black Pearls 607 (as evidenced by its slightly higher "Y" value) and to have a superior, i.e. bluer, tone as evidenced by its lower Yellowness Factor. Moreover, the viscosity of the mill paste prepared with the sulfonated black is markedly lower than that of the mill paste prepared with Black Pearls 607.

EXAMPLE III

Sulfonated blacks in alkyd-melamine baking enamel

A medium color channel black sold under the trade designation Black Pearls 71 by Cabot Corporation was sulfonated according to the procedure followed in Example II.

The sulfonated product comprised 0.684 milliequivalents per gram of sulfur and 0.65 milliequivalents per gram of $SO_3H$ groups.

The sulfonated black was incorporated into the alkyd melamine formulation as set forth above and evaluated with respect to color qualities. The evaluation was made using an enamel prepared with a non-sulfonated Black Pearls 71 as a control. This control was chosen because Black Pearls 71 is widely accepted as a good pigment in alkyd melamine resin systems. Nevertheless, the enamel prepared with sulfonated Black Pearls 71 had a much bluer tone and better jetness.

Among the alkyd resins useful in the practice of the invention are the various resins based on phthalic anhydride or the like and modified by naturally occurring oils such as the coconut, soybean, cottonseed and castor bean oils' alkyd-urea resins; and alkyd-melamine resins are also useful for forming compositions according to the invention. A wide variety of such materials are available from Allied Chemical Corporation under the trade designation "Plaskon."

Acrylic resins of the type useful in the present invention include those polymers and copolymers prepared by polymerization of acrylate monomers such as the following: acrylic acid, methacrylic acid, methyl acrylate, ethyl acrylate, n-butyl methacrylate, isobutyl methacrylate, n-tetradecyl methacrylate, n-hexadecyl methacrylate, n-octyl methacrylate, n-lauryl methacrylate, n-hexyl methacrylate, ethyl methacrylate, methyl methacrylate.

These monomers are merely typical of those known to the art and described in Organic Coating Technology by Payne (Wiley and Sons, New York, 1954). Many other homologs of these monomers can be used in the process of the invention. Usually a blend of such monomers is polymerized to give a coating that is appropriate to the use to which a particular lacquer or coating is to be put. For example hardness may sometimes be desirably achieved at the cost of an increased brittleness. More often hardness will be sacrificed to achieve a reduced brittleness. In achieving these property modifications, minor quantities of non-acrylate monomers or other plasticizing agents may be incorporated into the lacquer either in the compounding of the lacquer or by prior chemical or physical incorporation in the resin mass. In any event these resin-formulating strategies and techniques are well known in the art and do not form any part of this invention.

What is claimed is:

1. Carbon black pigmented compositions comprising a mixture of (a) an organic vehicle comprising a resinous material, and (b) a sulfonated carbon black bearing at least about 0.05 milliequivalent of —$SO_3H$ per gram thereof.

2. Carbon black pigmented compositions as defined in claim 1 wherein said organic vehicle is an alkyd resin-based lacquer system.

3. Carbon black pigmented compositions as defined in claim 1 wherein said organic vehicle is an acrylic resin system.

4. A composition as defined in claim 1 wherein said organic vehicle is a substantially aliphatic drying oil.

5. A composition as defined in claim 1 wherein each gram of said sulfonated carbon black bears between about 0.05 and about 1.00 milliequivalent of —$SO_3H$ thereon.

6. A composition as defined in claim 1 wherein the resinous material is an alkyd resin or acrylic resin and said sulfonated black is adjusted to a moisture concentration of from about 5 to about 25% based on the weight of the black.

7. A process for making an improved carbon black pigmented composition comprising the steps of sulfonating a carbon black to a concentration of at least about 0.05 milliequivalent of —$SO_3H$ per gram thereof, adjusting the moisture concentration thereof to between about 5 and about 25 weight percent thereof, and incorporating said carbon black into an organic vehicle comprising a resinous material.

8. A process as defined in claim 7 wherein said composition is an ink comprising an aliphatic coil vehicle.

9. A process as defined in claim 7 wherein said resinous material is an alkyd resin or an acrylic resin.

References Cited
UNITED STATES PATENTS

| | | | |
|---|---|---|---|
| 2,641,535 | 6/1953 | Cines | 23—209.1 |
| 3,054,751 | 9/1962 | Blake et al. | 260—40 |
| 3,121,017 | 2/1964 | Berstein et al. | 260—40 |

OTHER REFERENCES

Kirk-Othmer—Encyclopaedia of Chemical Technology, 2nd Ed., vol. 4, pp. 267, 275–277 (Interscience) (N.Y.) (1964).

MORRIS LIEBMAN, Primary Examiner

H. H. FLETCHER, Assistant Examiner

U.S. Cl. X.R.

106—20, 27; 260—37, 40, 41